G. H. THOMAS.
FLEXIBLE SHAFT COUPLING.
APPLICATION FILED FEB. 21, 1921.

1,396,979.

Patented Nov. 15, 1921.

Inventor.
George H. Thomas
By J. C. & H. W. Sturgeon
Atty's.

UNITED STATES PATENT OFFICE.

GEORGE H. THOMAS, OF WESTFIELD, NEW YORK, ASSIGNOR TO FLEXIBLE COUPLINGS COMPANY, OF WESTFIELD, NEW YORK, A CORPORATION OF NEW YORK.

FLEXIBLE SHAFT-COUPLING.

1,396,979.     Specification of Letters Patent.     Patented Nov. 15, 1921.

Application filed February 21, 1921. Serial No. 446,588.

*To all whom it may concern:*

Be it known that I, GEORGE H. THOMAS, a citizen of the United States, residing at Westfield, in the county of Chautauqua and State of New York, have invented certain new and useful Improvements in Flexible Shaft-Couplings; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to flexible shaft couplings, and has for its object the construction of such couplings in such a manner that its flexibility is effective, while at the same time it has a maximum torsional strength, and not liable to breakage from abnormal strains thereon.

The features of my invention are hereinafter fully set forth and explained and illustrated in the accompanying drawings, in which.

Figure 1:
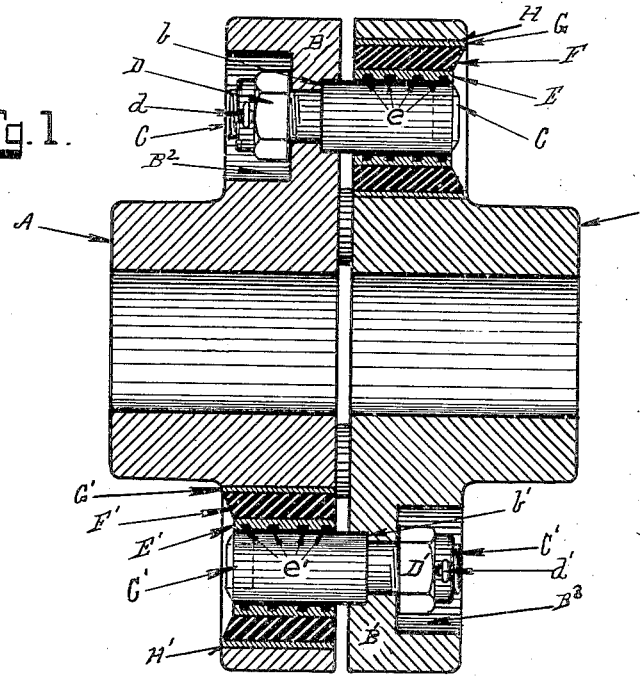
Figure 1, is a vertical central section of my improved flexible shaft coupling.
Figure 2:
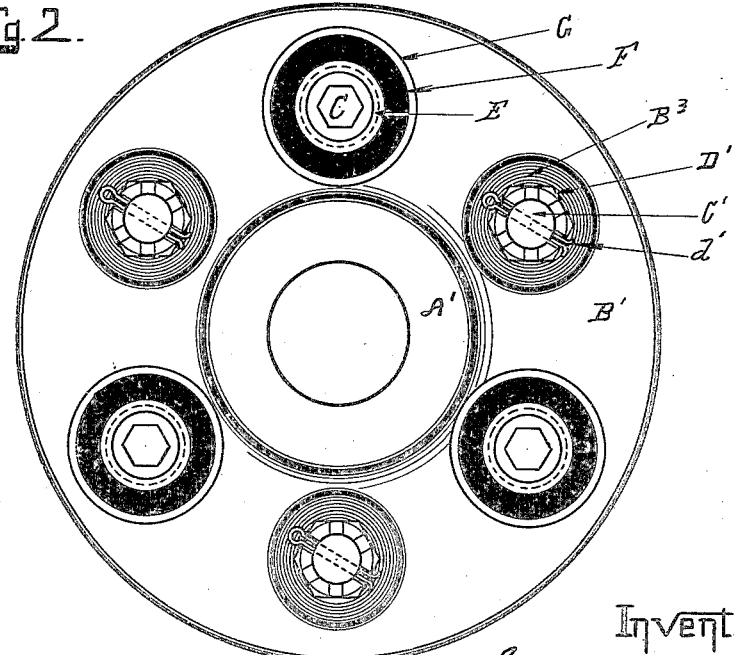
Fig. 2, is an end view in elevation of the same.

In these drawings A, A' are two collars adapted to be secured to the ends of shafts (not shown). On these collars there are radial flanges B, B'. Mounted in the flange B there are three studs C secured in said flange, equi-distant from each other, by nuts D and cotter-pins d, which retain the studs firmly in recesses H, against shoulders b in said flanges B. These studs C extend through the flange B' and are mounted in sleeves E provided with lubricating material, preferably plumbago e, on the inner surfaces thereof; and surrounding the sleeve E there is a resilient sleeve F, preferably of rubber, which is surrounded by a metal sleeve G; these parts being preferably vulcanized together and forced by pressure into the opening H in the flange B'.

In the flange B' there are likewise secured three studs C', which extend into and through like mountings E', F', G', and H' in the flange B. It will be observed that the studs C in the flange B alternate with the studs C' in the flange B' forming six studs, in all, equi-distant from each other.

In operation the studs C and C' move longitudinally in their lubricated bearings E and E' and the rubber sleeves F and F' yield as required to provide for the necessary flexibility required by the operation of the shafts coupled together as hereinbefore described.

Having thus described my invention so as to enable others to utilize and practice the same, what I claim as new and desire to secure by Letters Patent is:—

1. In a device of the class described, the combination of a pair of collars, radial flanges thereon, studs secured in each flange, bearing recesses in each flange alternating with the studs secured therein, said bearings comprising substantially a lubricated sleeve to slidably receive a stud secured in the other flange, and a resilient sleeve surrounding said lubricated sleeve, the whole being pressed into said recesses.

2. In a device of the character described, a pair of flanges adapted to be secured to shafts, studs secured in each flange, bearing recesses in each flange alternating with studs secured therein, bearings secured in said recesses, comprising substantially a lubricating sleeve and a resilient sleeve surrounding the lubricating sleeve, all of said sleeves being secured together and pressed into said recesses to form bearings integral with said flanges for the studs secured in the other flange.

3. In a device of the class described, the combination of a pair of collars, radial flanges thereon, studs secured in each flange, bearings in each flange alternating with the studs secured therein, said bearings comprising substantially a lubricated sleeve to slidably receive a stud secured in the other flange, a resilient sleeve surrounding said lubricated sleeve and a shell sleeve surrounding said resilient sleeve, the whole being secured in the flange.

4. In a device of the class described, a pair of flanges adapted to be secured to shafts, studs secured in each flange, bearing recesses in each flange alternating with studs secured therein, bearings secured in said recesses comprising substantially a lubricating sleeve, a resilient sleeve surrounding the lubricating sleeve, a shell surrounding said resilient sleeve, all of said sleeves being secured together and secured in said recesses to form bearings for the studs secured in the other flange.

In testimony whereof I affix my signature.

GEORGE H. THOMAS.